(12) United States Patent
Cooley et al.

(10) Patent No.: US 8,775,678 B1
(45) Date of Patent: Jul. 8, 2014

(54) AUTOMATED WIRELESS SYNCHRONIZATION AND TRANSFORMATION

(75) Inventors: Shaun Cooley, El Segundo, CA (US); Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 881 days.

(21) Appl. No.: 11/960,634

(22) Filed: Dec. 19, 2007

(51) Int. Cl.
*G06F 15/16* (2006.01)

(52) U.S. Cl.
USPC .......................................... 709/248

(58) Field of Classification Search
USPC .................... 709/248, 208–211, 227–229
See application file for complete search history.

(56) References Cited

U.S. PATENT DOCUMENTS

| | | | |
|---|---|---|---|
| 7,769,009 B1 * | 8/2010 | Katzer et al. .................. | 370/390 |
| 2002/0178261 A1 * | 11/2002 | Chang et al. .................. | 709/225 |
| 2004/0047471 A1 * | 3/2004 | Sawano ........................ | 380/250 |
| 2006/0218226 A1 * | 9/2006 | Johnson et al. ............... | 709/202 |
| 2006/0253501 A1 * | 11/2006 | Langan et al. ................ | 707/201 |

* cited by examiner

*Primary Examiner* — Thai Nguyen

(74) *Attorney, Agent, or Firm* — Brill Law Office; Jeffrey Brill

(57) ABSTRACT

An automated wireless synchronization platform allows users to synchronize files and folders between devices, while transparently providing content transformation services. The content transformation services ensure that content is synchronized to target devices in the appropriate format, at a proper balance of size and quality to be ideally output on the target devices.

20 Claims, 3 Drawing Sheets

AUTOMATED WIRELESS SYNCHRONIZATION AND TRANSFORMATION

TECHNICAL FIELD

This invention pertains generally to synchronization of computing devices, and more specifically to wirelessly synchronizing media files and documents between computing devices in appropriate formats.

BACKGROUND

Existing techniques for data synchronization between desktop machines and mobile devices are cumbersome and time consuming. Typically, these techniques involve the laborious process of connecting the mobile device to the desktop computer with a universal serial bus ("USB") cable, selecting the files to transfer, and manually dragging and dropping the selected files to the mobile device. The user must then keep the mobile device connected to the desktop computer, and wait while the transfer completes. Media files tend to be quite large, so the transfer-time can be extensive, especially where a large number of files has been selected.

Furthermore, the USB based transfer does not properly transform files into a format best suited for use on a given mobile device. A desktop computer can generally process and display images and video of a much higher quality than that supported by a mobile device. Higher quality media files are larger and require more computing power to process. Copying large files that cannot be fully supported by the mobile device unnecessarily lengthens the copying time, and wastes storage and processing resources of the mobile device. For example, suppose a user transfers a folder of 6+ megapixel photos and a high definition quality video to a mobile device. Although these high quality formats are appropriate for the desktop environment, the mobile device is not capable of displaying such high resolutions, and thus must display lower quality versions of the images. Thus, the copying of the 6+ megapixel photos and the high definition quality video is a poor use of the available computing resources.

It would be desirable to be able to automatically, wirelessly synchronize files between computing devices, in the formats appropriate for each device.

SUMMARY

Content is automatically, wirelessly synchronized between computing devices. A user entered synchronization policy specifies the content to synchronize from a source computing device to at least one target computing device. The source computing device can be a user's desktop computer, and target devices can be mobile computing devices, such as a smart cell phones. The target computing devices supply information directing the proper formats in which content is to be synchronized thereto. The content to be synchronized is transformed into the desired formats, for example the desired display resolution and audio format for the target device. Often, a mobile target device cannot display or process content at the full resolution appropriate to a desktop source device. The transformed content is wirelessly transmitted to the target computing device, according to the synchronization policy. The synchronization platform can be implemented as a peer-to-peer configuration of computing devices, or can be at least partially centralized through a synchronization manager.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
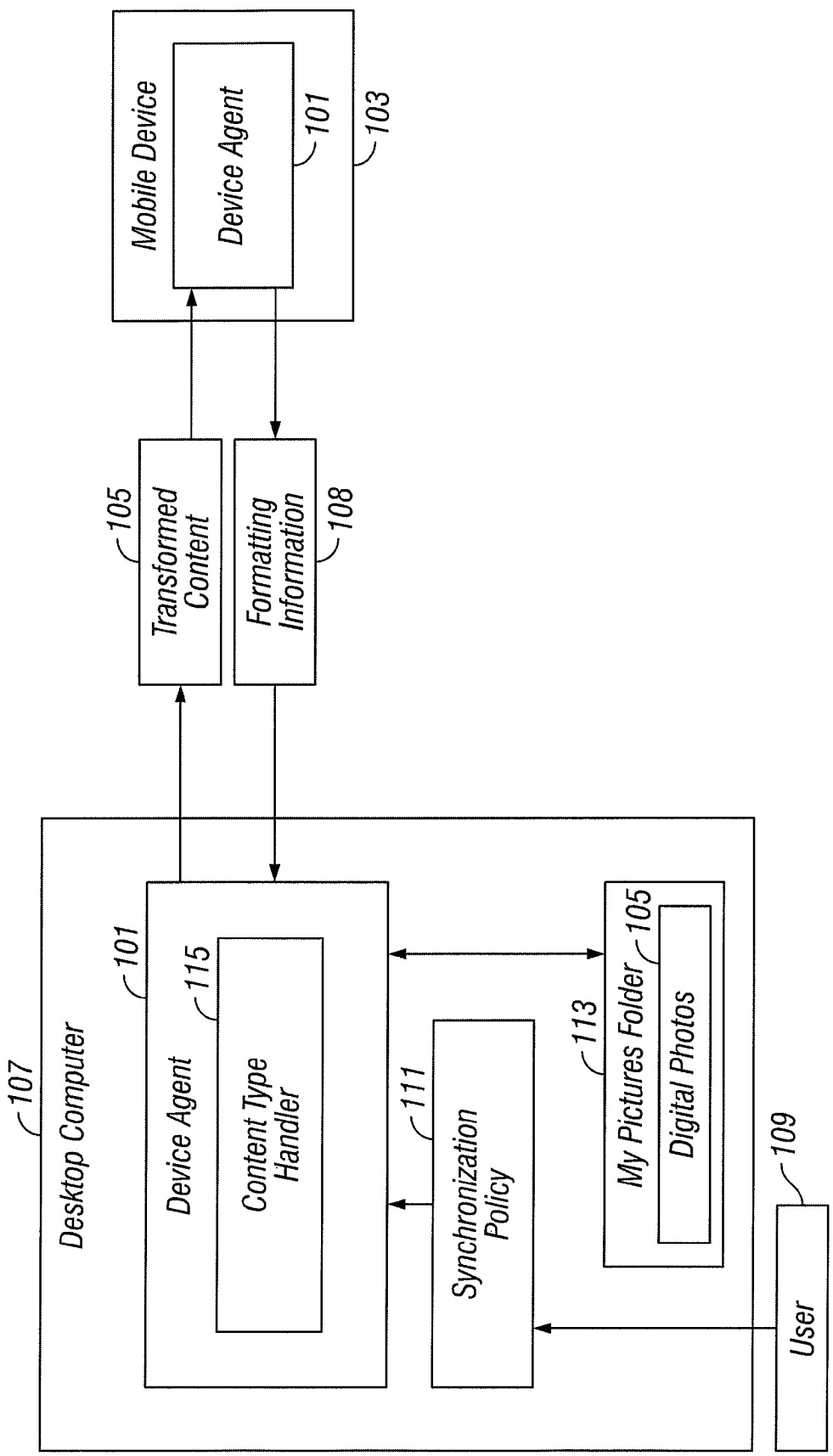
FIG. 1 is a block diagram illustrating a peer-to-peer configuration for wirelessly synchronizing content between devices, according to some embodiments of the present invention.

FIG. 1 illustrates a peer-to-peer configuration for wirelessly synchronizing content between devices in appropriate formats, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries. It is to be further understood that mobile devices 103 can comprise mobile telephones with built in computing power, personal digital assistants, hand held computing devices and any other form of portable computing device.

As illustrated in FIG. 1, a first device agent 101 runs on a mobile device 103, and a second agent 101 runs on a desktop computer 107. The device agents 101 wirelessly synchronize specified content 105 between the mobile device 103 and the desktop computer 107. As explained and illustrated in detail below, multiple device agents 101 can run on multiple mobile devices 103, which can operate in either a peer-to-peer manner, or through centralized synchronization manger 201. FIG. 1 illustrates only two device agents 101 wirelessly synchronizing content 105 directly between a desktop computer 107 and a mobile device 103 in order to explain the workings of an exemplary, simple device agent 101 scenario.

As illustrated in FIG. 1, the user 109 specifies a synchronization policy 111 to the device agent 101 running on the desktop computer 107 (through any type of interface). In other embodiments, user 109 entered synchronization policies 111 can govern other devices, as desired. In some embodiments, the device agent 101 running a computing device 107 automatically generates a synchronization policy 111, based on user generated content 105 stored on that device 107. In such embodiments, the device agent 101 locates user generated content 105 such as digital photographs, video, images, documents, emails, etc., stored on the device 107, and sets a synchronization policy 111 based thereon (e.g., synchronize all of the content 105 to a mobile device 103, synchronize the most recent content 105, synchronize 100 megabytes of video content, etc.). In any case, a synchronization policy 111 specifies which files and folders 105 are to be synchronized to which devices, and optionally additional synchronization parameters as well, as discussed in greater detail below.

Each device agent 101 running on a target device 103 polls its corresponding device 103 and determines appropriate format information 108 for processing various content 105 for that device 103. For example, the device agent 101 on the mobile device 103 determines the maximum supported display resolution, the number of speakers, the amount of available storage, etc. In some embodiments, users 109 can edit and/or overwrite these settings 108. Additionally, device agents 101 push and/or pull content 105 to and/or from other device agents 101 (as illustrated), or to and/or from the synchronization manager 201 as discussed below in conjunction with FIG. 2.

In the embodiment illustrated in FIG. 1, the user 109 specifies that the device agent 101 running on the desktop computer 103 is to synchronize digital photographs 105 in the My Pictures folder 113 to the mobile device 103. In other words, when updated or new photographs 105 are placed in the My Pictures folder 113, the device agent 101 on the desktop computer 107 pushes those photographs 105 to the mobile device 103. The device agent 101 on the mobile device 103 knows the appropriate display resolution for the mobile device 103, which would typically be a lower resolution than that used by the desktop computer 107. Therefore, the device agent 101 on the desktop computer 107 requests this formatting information 108 from the device agent 101 on the mobile device 103, and, as explained in detail below, transforms the content 105 into the proper format before transmitting it. In other embodiments, some or all of the content 105 transfer can be initiated by target devices 103, as desired.

The device agents 101 can use, for example, standard Transmission Control Protocol ("TCP") or User Datagram Protocol ("UDP") to communicate between the desktop computer 107 and the mobile device 103. These protocols can be used by device agents 101 to allow any two devices with internet connections (such as a 3G cell phone, a laptop with a 3G or WiFi connection, or a wired desktop) to synchronize content 105.

One or more content type handlers 115 use information provided by a device agent 101 to determine and execute the logistics of transforming content 105 into the appropriate format for use on the target device 103. The content handling functionality can be associated with device agents 101 in peer-to-peer embodiments as illustrated in FIG. 1. As discussed below in conjunction with FIG. 2, in centralized environments, content type handlers 115 can operate centrally on the synchronization manager 201.

In the peer-to-peer embodiment illustrated in FIG. 1, an image content type handler 115 responsible for digital photographic formats (e.g., JPEG) at the desktop device 107 asks the device agent on the mobile device 103 for the appropriate display information 108 for digital photographs 105 on the mobile device 103 (e.g., the maximum resolution and available storage). The image content type handler 115 uses this information 108 to properly scale photographs 105 for the mobile device 103, such that the device handler 101 on the mobile device 103 receives content 105 in the desired format. In some embodiments, some or all of the content handling is performed at the target device 103.

Note that it is possible that all of the photographs 105 in the My Pictures folder 113 might not fit on the mobile device 103, even once they are scaled down to the appropriate resolution. In this case, the device agent 101 on the desktop computer 107 could synchronize as many photographs as fit on the mobile device 103 at optimal resolution, all of the photographs 105 at a lower resolution, or another option as desired. Such choices can be specified by the synchronization policy 111 and/or default options can be executed, specifically where a synchronization policy 111 does not specify a course of action for an encountered scenario. The specific default behaviors to use is a variable design parameter.

As the photographic format image content type handler 115 transforms digital photographs for the target device 103, so too can additional image content type handlers 115 perform such functions for other formats. For example, a video content type handler 115 could poll the target device agent 101 for information 108 such as the maximum resolution, orientation (landscape vs. vertical), speaker count and storage space available. The video content type handler 115 could then properly scale video files 105 (e.g., MPEG) being synchronized to fit the target device 103. For example, if the source device 107 has 5.1 surround sound audio and the target device 103 has only two speakers, the audio channels of video and audio files 105 (e.g., MPEG, MP3) could be merged to produce a two-channel output. This greatly reduces the file size.

It is to be understood that the implementation mechanics of transforming content formats for optimal output on different devices is within the knowledge base of one of ordinary skill in the relevant art, and the use of such techniques within the context of various embodiments of the present invention would be readily apparent to one of such a skill level, in light of this specification.

Figure 2:
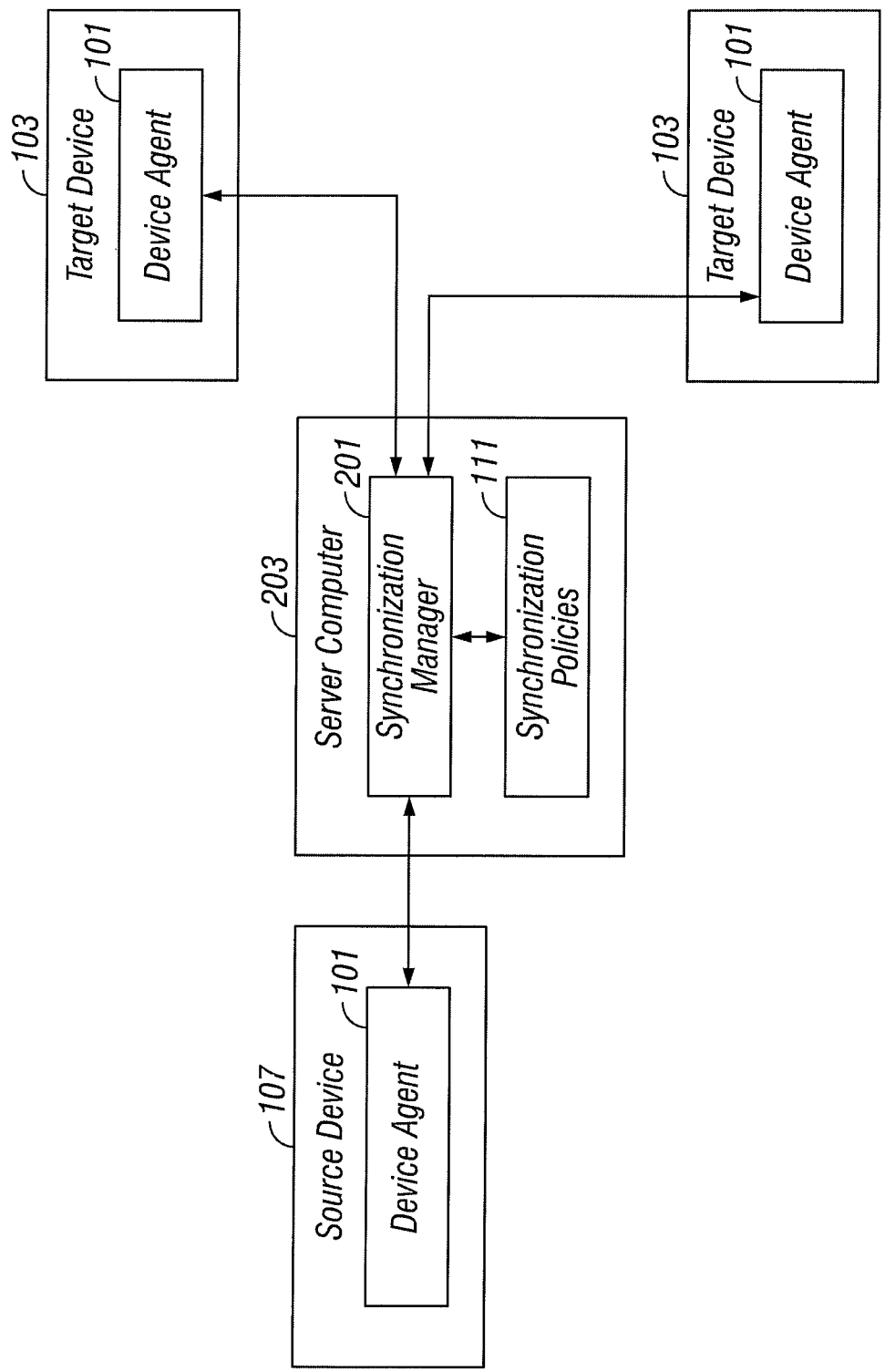
FIG. 2 is a block diagram illustrating a centralized configuration for wirelessly synchronizing content between devices, according to some embodiments of the present invention.

Turning now to FIG. 2, a centralized embodiment is illustrated in which much of the synchronization functionality is executed by a synchronization manager 201, running for example on a server computer 203. The synchronization manager 101 assists in network negotiations between various devices 107, 103 and can also cache content files 105 for future synchronization, should a target device 103 be offline. As illustrated in FIG. 2, the synchronization policies 111 of one or more users 107 can be processed and enforced by the synchronization manager 201. The synchronization manager 201 can be responsible for polling source devices 107 to determine when they have new content to be pushed out to target devices 103, polling target devices concerning desired format information 108 (or storing such information 108 locally), transforming content 105 into appropriate formats and managing transmissions between devices 107, 103. It is to be understood that these various functions can be as centralized or as distributed as desired. In various embodiments, certain functionalities are managed or assisted by the synchronization manager 201 whereas other functionalities are executed in whole or in part directly by the device(s) 107, 103.

Figure 3:
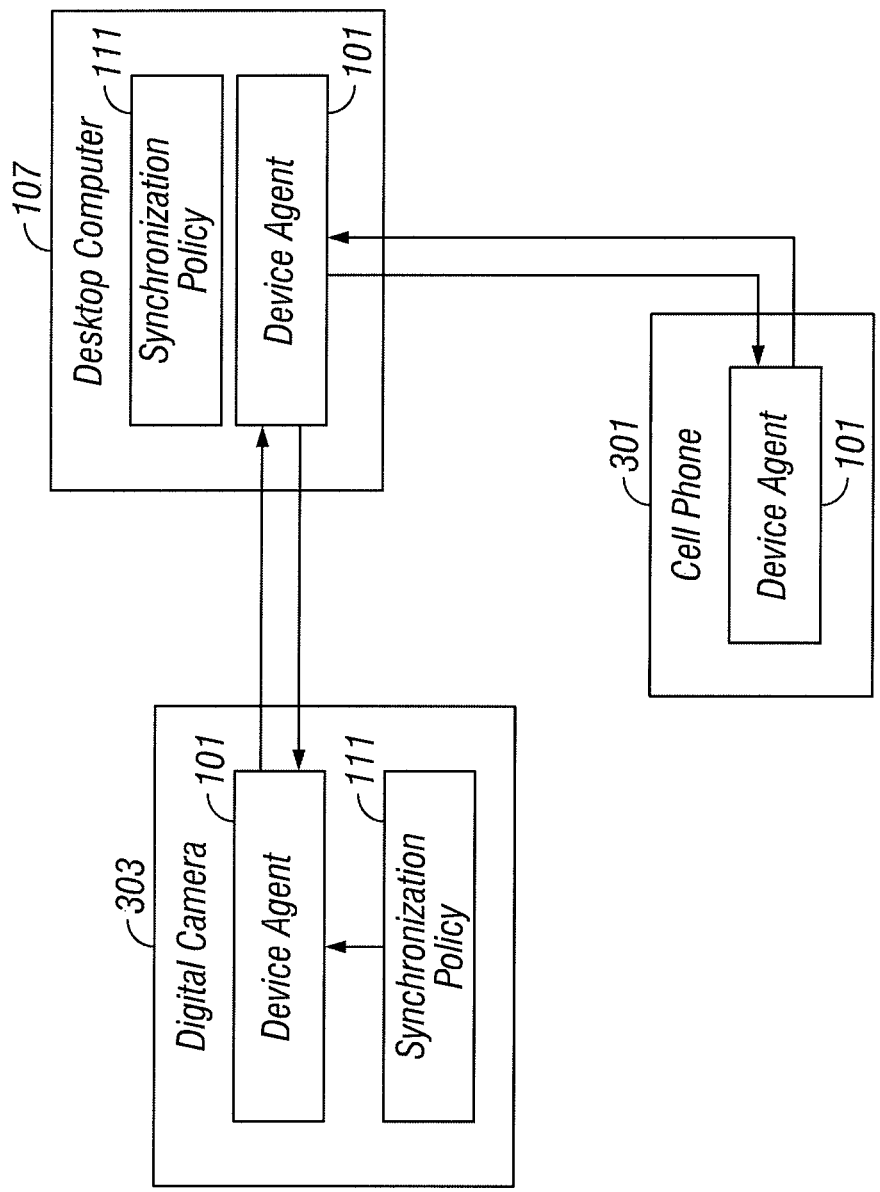
FIG. 3 is a block diagram illustrating configuration for wirelessly synchronizing content between multiple devices, according to some embodiments of the present invention.

As illustrated in FIG. 3, wireless synchronization according to both centralized and peer-to-peer embodiments of the present invention can be more detailed than simply synchronizing individual files or folders 105 between devices 107, 103. For example, a user 109 could create a synchronization policy 111 to automatically synchronize, for example, the 100 most recent photographs in the 'c:\photos' folder 105 of his desktop computer 107 to his 3G mobile phone 301. The user 109 could come home, connect his digital camera 303 to his desktop computer 107, transfer all new photographs to the 'c:\photos' folder 105, and go to bed. The 100 most recent photographs 105 would automatically be wirelessly synchronized to the user's cell phone 301, scaled to the proper resolution (e.g., 320×240), while the user 109 slept. The next day at work, the user 109 could simply take out his phone 301, and show these photographs 105 to a co-worker.

Going one step further, a device agent 101 could be installed on a digital camera 303 that has wireless connectivity (e.g., 3G, WiFi, Bluetooth, etc.). This device agent 101 could be governed by a synchronization policy 111 to automatically synchronize each photograph 105 taken to the cell phone 301 and the desktop computer 107, such that the phone 301 stores the 100 most recent photographs 105 (or, e.g., 40 MB worth) at a reduced resolution, whereas the desktop 107 stores all of them at full resolution.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. As will be readily apparent to those of ordinary skill in the relevant art, as used herein, the term "computer readable medium" does not mean an electrical signal separate from an underlying physical medium, but instead a non-transitory computer readable medium. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for automatically, wirelessly synchronizing content between at least two computing devices, the method comprising the steps of:

maintaining at least one synchronization policy concerning a user, the at least one synchronization policy specifying at least a plurality of specific content files to synchronize from a source computing device in a source format to at least one target computing device in at least one separate target format;

automatically detecting specific content in the source format associated with the source computing device to synchronize to the at least one target computing device in the at least one separate target format, according to the synchronization policy;

automatically retrieving from a device agent executing on the at least one target computing device, responsive to the detection, a specific parameter of formatting information for synchronizing the automatically detected content on the at least one target computing device in at least one separate target format, the formatting information comprising at least one output parameter concerning the at least one target computing device, the specific parameter determined by the device agent running on the at least one target computing device, wherein the device agent directly polls the at least one target computing device, and wherein the parameter is related to a capability of the at least one target computing device;

automatically retrieving from the at least one target computing device, a current condition associated with the at least one target computing device;

transforming the detected specific content to synchronize according to the formatting information from the source format to the at least one separate target format, wherein transforming the content to synchronize further comprises performing a transformation from a group consisting of: converting the specific content to lower display resolution, converting the specific content to a lower audio resolution and selecting a subset of the specific content to synchronize in response to an amount of available memory space on the at least one target computing device, according to the current condition; and wirelessly synchronizing the transformed content to the at least one target computing device in the at least one separate target format, according to the synchronization policy, using peer-to-peer communication or communicating over a network through a centralized synchronization manager.

2. The method of claim 1 wherein the at least one synchronization policy specifies at least one directive from a group of directives consisting of:

at least one specific file to synchronize to the at least one target computing device;

at least one specific file type to synchronize to the at least one target computing device;

a specific number of files to synchronize to the at least one target computing device;

a specific quantity of content to synchronize to the at least one target computing device;

at least one folder to synchronize to the at least one target computing device.

3. The method of claim 1 further comprising: polling the at least one target computing device for associated formatting information.

4. The method of claim 1 wherein formatting information concerning the at least target computing device further comprises at least one type from a group of types consisting of:

a maximum supported display resolution;
a preferred supported display resolution;
display configuration information;
a number of speakers;
an amount of available storage space;
memory configuration information; and
processor information.

5. The method of claim 1 wherein wirelessly synchronizing the transformed content to the at least one target computing device further comprises:
 wirelessly transmitting the transformed content to the at least one target computing device.

6. The method of claim 1 wherein at least one of the steps is performed by at least one device from a group of devices consisting of:
 the source computing device;
 a centralized synchronization device; and
 the at least one target computing device.

7. The method of claim 1 further comprising: detecting that the at least one target computing device is offline; and
 caching content to be synchronized to the at least one target computing device.

8. The method of claim 1 further comprising:
 synchronizing content from the source computing device to at least another target computing device.

9. The method of claim 1 wherein maintaining a synchronization policy concerning the user further comprises performing a step from a group of steps consisting of:
 receiving the at least one synchronization policy from the user; and
 locating user generated content on the source computing device and automatically generating the at least one synchronization policy based on the located user generated content.

10. At least one non-transitory computer readable medium containing a computer program product for automatically, wirelessly synchronizing content between at least two computing devices, the computer program product comprising:
 program code for maintaining at least one synchronization policy concerning a user, the at least one synchronization policy specifying at least a plurality of specific content files to synchronize from a source computing device in a source format to at least one target computing device in at least one separate target format;
 program code for automatically detecting specific content in the source format associated with the source computing device to synchronize to the at least one target computing device in the at least one separate target format, according to the at least one synchronization policy;
 program code for automatically retrieving from a device agent executing on the at least one target computing device, responsive to the detection, a specific parameter of formatting information for synchronizing the automatically detected content on the at least one target computing device in at least one separate target format, the formatting information comprising at least one output parameter concerning the at least one target computing device, the specific parameter determined by the device agent running on the at least one target computing device, wherein the device agent directly polls the at least one target computing device, and wherein the parameter is related to a capability of the at least one target computing device;
 program code for automatically retrieving from the at least one target computing device, a current condition associated with the at least one target computing device;
 program code for transforming the detected specific content to synchronize according to the formatting information from the source format to the at least one separate target format, wherein transforming the content to synchronize further comprises performing a transformation from a group consisting of: converting the specific content to lower display resolution, converting the specific content to a lower audio resolution and selecting a subset of the specific content to synchronize in response to an amount of available memory space on the at least one target computing device, according to the current condition;
 program code for wirelessly synchronizing the transformed content to the at least one target computing device in the at least one separate target format, according to the at least one synchronization policy, using peer-to-peer communication or communicating over a network through a centralized synchronization manager.

11. The computer program product of claim 10 wherein the at least one synchronization policy specifies at least one directive from a group of directives consisting of:
 at least one specific file to synchronize to the at least one target computing device;
 at least one specific file type to synchronize to the at least one target computing device;
 a specific number of files to synchronize to the at least one target computing device;
 a specific quantity of content to synchronize to the at least one target computing device;
 at least one folder to synchronize to the at least one target computing device.

12. The computer program product of claim 10 further comprising:
 program code for polling the at least one target computing device for associated formatting information.

13. The computer program product of claim 10 wherein formatting information concerning the at least one target computing device further comprises at least one type from a group of types consisting of:
 a maximum supported display resolution;
 a preferred supported display resolution;
 display configuration information;
 a number of speakers;
 an amount of available storage space;
 memory configuration information; and
 processor information.

14. The computer program product of claim 10 wherein the program code for wirelessly synchronizing the transformed content to the at least one target computing device further comprises:
 program code for wirelessly transmitting the transformed content to the at least one target computing device.

15. The computer program product of claim 10 further comprising:
 program code for detecting that the at least one target computing device is offline; and
 program code for caching content to be synchronized to the at least one target device.

16. The computer program product of claim 10 further comprising:
 program code for synchronizing content from the source computing device to another target computing device.

17. The computer program product of claim 10 wherein the program code for maintaining at least one synchronization policy concerning the user further comprises program code for performing at least one step from a group of steps consisting of:
 receiving the at least one synchronization policy from the user; and
 locating user generated content on the source computing device and automatically generating the at least one synchronization policy based on the located user generated content.

18. A computer system for automatically, wirelessly synchronizing content between at least two computing devices, the computer system comprising:
- a source computing device comprising memory instructions executed by a processor to operate a first device agent;
- a target computing device comprising memory instructions executed by a processor to operate a second device agent;
- wherein the first device agent is programmed to maintain at least one synchronization policy concerning a user, the at least one synchronization policy specifying at least a plurality of specific content files to synchronize from the source computing device in a source format to the target computing device in at least one separate target format, the first device agent to automatically detect specific content in the source format associated with the source computing device to synchronize to the target computing device in the at least one separate target format, according to the at least one synchronization policy, the first device agent to automatically retrieve from the second device agent executing on the target computing device, responsive to the detection, a specific parameter of formatting information for synchronizing the automatically detected content on the target computing device in at least one separate target format, the formatting information comprising at least one output parameter concerning the target computing device, the specific parameter determined by the second device agent running on the target computing device, wherein the second device agent directly polls the target computing device, wherein the parameter is related to a capability of the target computing device, the first device agent to automatically retrieve from the target computing device a current condition associated with the target computing device, the first device agent to transform the specific content to synchronize according to the formatting information from the source format to the at least one separate target format, wherein transforming the content to synchronize further comprises performing a transformation from a group consisting of: converting the specific content to lower display resolution, converting the specific content to a lower audio resolution and selecting a subset of the specific content to synchronize in response to an amount of available memory space on the target computing device, according to the current condition, and the first device agent to wirelessly synchronize the transformed content to the target computing device in the at least one separate target format, according to the synchronization policy, using peer-to-peer communication or communicating over a network through a centralized synchronization manger.

19. The computer system of claim 18 wherein the first device agent polls the at least one target computing device for associated formatting information.

20. The computer system of claim 18 wherein the first device agent wirelessly transmits the transformed content to the at least one target computing device.

* * * * *